United States Patent
Choi et al.

(10) Patent No.: US 8,686,883 B2
(45) Date of Patent: *Apr. 1, 2014

(54) CODEBOOK FOR MULTIPLE USER MULTIPLE INPUT MULTIPLE OUTPUT SYSTEM AND COMMUNICATION DEVICE USING THE CODEBOOK

(75) Inventors: Joon-Il Choi, Seoul (KR); Yongxing Zhou, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

This patent is subject to a terminal disclaimer.

(21) Appl. No.: 13/233,761

(22) Filed: Sep. 15, 2011

(65) Prior Publication Data
US 2012/0001780 A1    Jan. 5, 2012

Related U.S. Application Data

(63) Continuation of application No. 12/250,078, filed on Oct. 13, 2008, now Pat. No. 8,031,090.

(30) Foreign Application Priority Data

Nov. 21, 2007  (CN) .......................... 2007 1 0186649
Jun. 9, 2008  (KR) ........................ 10-2008-0053697

(51) Int. Cl.
    *H03M 7/00*  (2006.01)
(52) U.S. Cl.
    USPC ........... 341/106; 375/295; 375/267; 370/329; 370/336; 455/562.1; 455/435.1; 341/107; 341/70; 341/80

(58) Field of Classification Search
    USPC ............. 341/50–107; 375/295, 267; 370/329, 370/336; 455/562.1, 435.1
    See application file for complete search history.

(56) References Cited

U.S. PATENT DOCUMENTS

| | | | |
|---|---|---|---|
| 7,593,729 B2 | 9/2009 | Barak et al. | |
| 2006/0279460 A1* | 12/2006 | Yun et al. | 342/377 |
| 2007/0195908 A1* | 8/2007 | Attar et al. | 375/267 |
| 2008/0227495 A1 | 9/2008 | Kotecha et al. | |
| 2009/0046801 A1 | 2/2009 | Pan et al. | |

FOREIGN PATENT DOCUMENTS

| | | |
|---|---|---|
| KR | 10-2007-0052511 | 5/2007 |
| WO | WO 2007/093907 | 8/2007 |

OTHER PUBLICATIONS

U.S. Appl. No. 12/250,078, filed Oct. 13, 2008, Joon-Il Choi et al., Samsung Electronics Co., Ltd.

* cited by examiner

*Primary Examiner* — Lam T Mai
(74) *Attorney, Agent, or Firm* — NSIP Law

(57) ABSTRACT

Disclosed are a Multiple User Multiple Input Multiple Output (MU-MIMO) codebook design method, and a communication device using the codebook. A MU-MIMO codebook design method includes analyzing beam patterns of candidate vectors included in a predetermined candidate codebook, and eliminating at least one of the candidate vectors based on the beam patterns of the candidate vectors to generate the MU-MIMO codebook for a MU-MIMO system being comprised of the remaining vectors.

8 Claims, 6 Drawing Sheets

CODEBOOK FOR MULTIPLE USER MULTIPLE INPUT MULTIPLE OUTPUT SYSTEM AND COMMUNICATION DEVICE USING THE CODEBOOK

CROSS-REFERENCE TO RELATED APPLICATIONS

This application is a continuation of application Ser. No. 12/250,078 filed on Oct. 13, 2008, which claims the benefit of Chinese Patent Application No. 200710186649.7, filed on Nov. 21, 2007, in the Chinese Intellectual Property Office, and claims the benefit of Korean Patent Application No. 10-2008-0053697, filed on Jun. 9, 2008, in the Korean Intellectual Property Office, the entire disclosures of which are incorporated herein by reference for all purposes.

TECHNICAL FIELD

The following description relates to a method of designing a codebook and a system using the same, and more particularly, a Multiple-User Multiple-Input Multiple-Output (MU-MIMO) codebook design method and a communication system and device using the same.

BACKGROUND

Currently, many researches are being conducted regarding technologies to provide various types of multimedia services including voice services and to support high quality and high speed data transmission in a wireless communication environment. For example, technologies associated with a Multiple-Input Multiple-Output (MIMO) communication system using multiple channels are in rapid development.

In general, a MIMO communication system utilizes a base station, and may be classified into a Multiple-User (MU) MIMO system comprising a plurality of users and a single base station, and a Single-User (SU) MIMO system comprising a single user and a single base station.

In a MIMO communication system, a base station and terminals may use a codebook. A certain space may be quantized into a plurality of vectors. The plurality of vectors generated by quantizing the particular space may be stored in the base station and the terminals as the codebook.

For example, each of the terminals may select any one matrix or vector from the plurality of matrixes or vectors included in the codebook, based on a channel that is formed between the base station and each of the terminals. The base station may also recognize the selected matrix or vector based on the codebook. The selected matrix or vector may be used for generating a transmission signal.

A number of studies have been made for a codebook used in a SU-MIMO system. However, there is need for a further study of a codebook used in a MU-MIMO system. For example, in a case where a cell of a base station includes a plurality of sectors, there is a need for an optimized codebook for use in a MU-MIMO system.

SUMMARY

According to an aspect, a Multiple-User Multiple-Input Multiple-Output (MU-MIMO) codebook design method comprises analyzing beam patterns of candidate vectors included in a predetermined candidate codebook, and eliminating at least one of the candidate vectors based on the beam patterns of the candidate vectors to generate the MU-MIMO codebook for a MU-MIMO system being comprised of the remaining vectors.

The method may further comprise optimizing the MU-MIMO codebook based on interferences existed between the remaining vectors.

According to another aspect, a method for operating a base station comprises storing a part or all of vectors included in $[u_1\ u_2\ u_4\ u_5\ u_6\ u_7\ u_8]$ as a MU-MIMO codebook, and pre-coding at least one data stream using the stored MU-MIMO codebook, wherein $$u_1 = \frac{1}{2}[1\ \ 1\ \ 1\ \ 1]^T,$$

$$u_2 = \frac{1}{2}[1\ \ j\ \ -1\ \ -j]^T,$$

$$u_4 = \frac{1}{2}[1\ \ -j\ \ -1\ \ j]^T,$$

$$u_5 = \frac{1}{2}[1\ \ e^{j\frac{\pi}{4}}\ \ j\ \ e^{j\frac{3\pi}{4}}]^T,$$

$$u_6 = \frac{1}{2}[1\ \ e^{j\frac{3\pi}{4}}\ \ -j\ \ e^{j\frac{\pi}{4}}]^T,$$

$$u_7 = \frac{1}{2}[1\ \ e^{j\frac{5\pi}{4}}\ \ j\ \ e^{-j\frac{\pi}{4}}]^T, \text{ and}$$

$$u_8 = \frac{1}{2}[1\ \ e^{-j\frac{\pi}{4}}\ \ -j\ \ e^{j\frac{5\pi}{4}}]^T.$$

According to still another aspect, a method for operating a base station comprises storing a part or all of vectors included in $[u_{14}\ u_{10}\ u_6\ u_2\ u_{13}\ u_9\ u_5\ u_1\ u_{16}\ u_{12}\ u_8\ u_4\ u_{15}\ u_{11}]$ or $[u_{10}\ u_6\ u_2\ u_{13}\ u_9\ u_5\ u_1\ u_{16}\ u_{12}\ u_8\ u_4\ u_{15}\ u_{11}\ u_7]$ as a MU-MIMO codebook, and pre-coding at least one data stream using the stored MU-MIMO codebook, wherein $u_1 = [0.5\ 0.5\ 0.5\ 0.5]^T,$ $u_2 = [0.5\ 0.5j\ -0.5\ -0.5j]^T,$ $u_4 = [0.5\ -0.5j\ -0.5\ 0.5j]^T,$ $u_5 = [0.5\ 0.4619 + 0.1913j\ 0.3536 + 0.536j\ 0.1913 + 0.4619j]^T,$ $u_6 = [0.5\ -0.1913 + 0.4619j\ -0.3536 - 0.3536j\ 0.419 - 0.1913j]^T,$ $u_7 = [0.5\ -0.4619 - 0.1913j\ 0.3536 + 0.3536j\ -0.1913 - 0.4619j]^T,$ $u_8 = [0.5\ 0.1913 - 0.4619j\ -0.3536 - 0.3536j\ -0.4619 + 0.1913j]^T,$ $u_9 = [0.5\ 0.3536 + 0.3536j\ 0.5j\ -0.3536 + 0.3536j]^T,$ $u_{10} = [0.5\ -0.3536 + 0.3536j\ -0.5j\ 0.3536 + 0.3536j]^T,$ $u_{11} = [0.5\ -0.3536 - 0.3536j\ 0.5j\ 0.3536 - 0.3536j]^T,$ $u_{12} = [0.5\ 0.3536 - 0.3536j\ -0.5j\ -0.3536 - 0.3536j]^T,$ $u_{13} = [0.5\ 0.1913 + 0.4619j\ -0.3536 + 0.3536j\ -0.4619 - 0.1913j]^T,$ $u_{14} = [0.5\ -0.4619 + 0.1913j\ 0.3536 - 0.3536j\ -0.1913 + 0.4619j]^T,$ $u_{15} = [0.5\ -0.1913 - 0.4619j\ -0.3536 + 0.3536j\ 0.4619 + 0.1913j]^T,$ and $u_{16}=[0.5 0.4619-0.1913j 0.3536-0.3536j 0.1913-0.4619j]^T$.

According to yet another aspect, a method for operating a base station comprises storing a part or all of vectors included in $[u_2\ u_{13}\ u_9\ u_5\ u_1\ u_{16}\ u_{12}\ u_8]$ or $[u_{13}\ u_9\ u_5\ u_1\ u_{16}\ u_{12}\ u_8\ u_4]$ as a MU-MIMO codebook, and pre-coding at least one data stream using the stored MU-MIMO codebook, wherein $u_1=[0.5 0.5 0.5 0.5]^T$, $u_2=[0.5 0.5j-0.5-0.5j]^T$, $u_4=[0.5-0.5j-0.5 0.5j]^T$, $u_5=[0.5 0.4619+0.1913j 0.3536+0.536j 0.1913+0.4619j]^T$, $u_8=[0.5 0.1913-0.4619j-0.3536-0.3536j-0.4619+0.1913j]^T$, $u_9=[0.5 0.3536+0.3536j 0.5j-0.3536+0.3536j]^T$, $u_{12}=[0.5 0.3536-0.3536j-0.5j-0.3536-0.3536j]^T$, $u_{13}=[0.5 0.1913+0.4619j-0.3536+0.3536j-0.4619-0.1913j]^T$, and $u_{16}=[0.5 0.4619-0.1913j 0.3536-0.3536j 0.1913-0.4619j]^T$.

According to yet another aspect, a method for operating a terminal comprises storing a part or all of vectors included in $[u_1\ u_2\ u_4\ u_5\ u_6\ u_7\ u_8]$ as a MU-MIMO codebook, and feeding-back, to a base station, information related with at least one vector from among vectors included in the stored MU-MIMO codebook, wherein $$u_1 = \frac{1}{2}[1\ \ 1\ \ 1\ \ 1]^T,$$

$$u_2 = \frac{1}{2}[1\ \ j\ \ -1\ \ -j]^T,$$

$$u_4 = \frac{1}{2}[1\ \ -j\ \ -1\ \ j]^T,$$

$$u_5 = \frac{1}{2}\left[1\ \ e^{j\frac{\pi}{4}}\ \ j\ \ e^{j\frac{3\pi}{4}}\right]^T,$$

$$u_6 = \frac{1}{2}\left[1\ \ e^{j\frac{3\pi}{4}}\ \ -j\ \ e^{j\frac{\pi}{4}}\right]^T,$$

$$u_7 = \frac{1}{2}\left[1\ \ e^{j\frac{5\pi}{4}}\ \ j\ \ e^{-j\frac{\pi}{4}}\right]^T, \text{ and}$$

$$u_8 = \frac{1}{2}\left[1\ \ e^{-j\frac{\pi}{4}}\ \ -j\ \ e^{j\frac{5\pi}{4}}\right]^T.$$

According to yet another aspect, a method for operating a terminal comprises storing a part or all of vectors included in $[u_2\ u_5\ u_1\ u_8]$ or $[u_5\ u_1\ u_8\ u_4]$ as a MU-MIMO codebook, and feeding-back, to a base station, information related with at least one vector from among vectors included in the stored MU-MIMO codebook, wherein $$u_1 = \frac{1}{2}[1\ \ 1\ \ 1\ \ 1]^T,$$

$$u_2 = \frac{1}{2}[1\ \ j\ \ -1\ \ -j]^T,$$

-continued $$u_4 = \frac{1}{2}[1\ \ -j\ \ -1\ \ j]^T,$$

$$u_5 = \frac{1}{2}\left[1\ \ e^{j\frac{\pi}{4}}\ \ j\ \ e^{j\frac{3\pi}{4}}\right]^T, \text{ and}$$

$$u_8 = \frac{1}{2}\left[1\ \ e^{-j\frac{\pi}{4}}\ \ -j\ \ e^{j\frac{5\pi}{4}}\right]^T.$$

According to yet another aspect, a method for operating a terminal comprises storing a part or all of vectors included in $[u_{14}\ u_{10}\ u_6\ u_2\ u_{13}\ u_9\ u_5\ u_1\ u_{16}\ u_{12}\ u_8\ u_4\ u_{15}\ u_{11}]$ or $[u_{10}\ u_6\ u_2\ u_{13}\ u_9\ u_5\ u_1\ u_{16}\ u_{12}\ u_8\ u_4\ u_{15}\ u_{11}\ u_7]$ as a MU-MIMO codebook, and feeding-back, to a base station, information related with at least one vector from among vectors included in the stored MU-MIMO codebook, wherein $u_1=[0.5 0.5 0.5 0.5]^T$, $u_2=[0.5 0.5j-0.5-0.5j]^T$, $u_4=[0.5-0.5j-0.5 0.5j]^T$, $u_5=[0.5 0.4619+0.1913j 0.3536+0.536j 0.1913+0.4619j]^T$, $u_7=[0.5-0.4619-0.1913j 0.3536+0.3536j-0.1913-0.4619j]^T$, $u_8=[0.5 0.1913-0.4619j-0.3536-0.3536j-0.4619+0.1913j]^T$, $u_9=[0.5 0.3536+0.3536j 0.5j-0.3536+0.3536j]^T$, $u_{10}=[0.5-0.3536+0.3536j-0.5j 0.3536+0.3536j]^T$, $u_{11}=[0.5-0.3536-0.3536j 0.5j 0.3536-0.3536j]^T$, $u_{12}=[0.5 0.3536-0.3536j-0.5j-0.3536-0.3536j]^T$, $u_{13}=[0.5 0.1913+0.4619j-0.3536+0.3536j-0.4619-0.1913j]^T$, $u_{14}=[0.5-0.4619+0.1913j 0.3536-0.3536j-0.1913+0.4619j]^T$, $u_{15}=[0.5-0.1913-0.4619j-0.3536+0.3536j 0.4619+0.1913j]^T$, and $u_{16}=[0.5 0.4619-0.1913j 0.3536-0.3536j 0.1913-0.4619j]^T$.

According to yet another aspect, a method for operating a terminal comprises storing a part or all of vectors included in $[u_2\ u_{13}\ u_9\ u_5\ u_1\ u_{16}\ u_{12}\ u_8]$ or $[u_{13}\ u_9\ u_5\ u_1\ u_{16}\ u_{12}\ u_8\ u_4]$ as a MI-MIMO codebook, and feeding-back, to a base station, information related with at least one vector from among vectors included in the stored MU-MIMO codebook, wherein $u_1=[0.5 0.5 0.5 0.5]^T$, $u_2=[0.5 0.5j-0.5-0.5j]^T$, $u_4=[0.5-0.5j-0.5 0.5j]^T$, $u_5=[0.5 0.4619+0.1913j 0.3536+0.536j 0.1913+0.4619j]^T$, $u_8=[0.5 0.1913-0.4619j-0.3536-0.3536j-0.4619+0.1913j]^T$, $u_9=[0.5 0.3536+0.3536j 0.5j-0.3536+0.3536j]^T$, $$u_{12}=[0.5 \ 0.3536-0.3536j \ -0.5j \ -0.3536-0.3536jj]^T,$$

$$u_{13}=[0.5 \ 0.1913+0.4619j \ -0.3536+0.3536j \ -0.4619-0.1913jj]^T,$$

and $$u_{16}=[0.5 \ 0.4619-0.1913j \ 0.3536-0.3536j \ 0.1913-0.4619jj]^T.$$

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
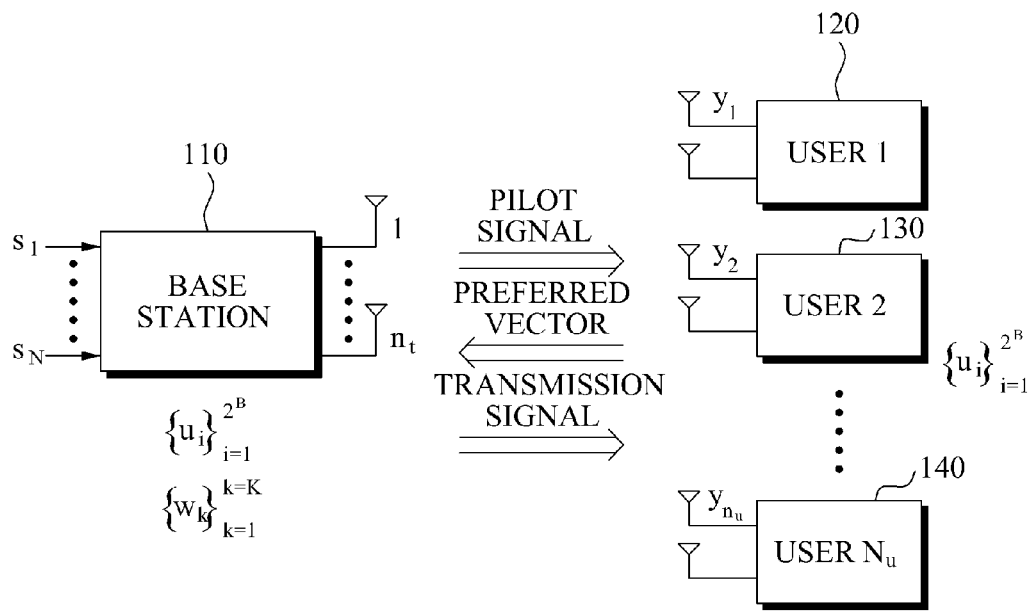
FIG. 1 is a diagram illustrating a Multiple-Users Multiple-Input Multiple-Output (MU-MIMO) system according to an exemplary embodiment.

FIG. 1 illustrates a Multiple-Users Multiple-Input Multiple-Output (MU-MIMO) system according to an exemplary embodiment.

Referring to FIG. 1, the MU-MIMO system comprises a base station 110, and a plurality of users 120, 130, and 140. A plurality of antennas is installed in the base station 110, and a single antenna or a plurality of antennas may be installed in each of the plurality of users 120, 130, and 140. A channel is formed between the base station 110 and the plurality of users 120, 130, and 140, and the base station 110 and the plurality of users 120, 130, and 140 transmits/receives signals through the formed channel.

The base station 110 may transmit at least one data stream to the plurality of users 120, 130, and 140. The base station 110 may perform beamforming on the data stream according to, for example, a Spatial Division Multiplexing Access (SDMA) scheme. The base station 110 may generate a pre-coding matrix $W_k$ using a codebook $\{u_i\}_{i=1}^{2^B}$, and also generate transmission signals using the generated pre-coding matrix $W_k$.

The base station 110 transmits pilot signals to the plurality of users 120, 130, and 140 through a downlink channel. Here, the pilot signals are signals well-known to the base station 110 and the plurality of users 120, 130, and 140.

Each of the plurality of users 120, 130, and 140 estimates the channel formed between the base station 110 and the plurality of users 120, 130, and 140 using the pilot signals. Also, the plurality of users 120, 130, and 140 selects, as a preferred vector, any one vector of vectors included in a codebook previously stored based on the estimated channel. Here, $u_i$ is an i-th vector included in the codebook, and B is a number of feedback bits. Specifically, where the number of feedback bits is B-bits, $2^B$ vectors generated by quantizing a space are stored in the codebook. Each of all users may have an identical number of feedback bits, however, may have the number of feedback bits which is different for each users according to various factors such as different channel environments of the users, Signal to Interference and Noise Ratio (SINR), and the like in a more optimized manner.

Also, each of the plurality of users 120, 130, and 140 may select any one vector of $2^B$ vectors as a preferred vector with a variety of standards.

For example, each of the plurality of users 120, 130, and 140 may select any one vector of $2^B$ vectors as the preferred vector based on an achievable data transmission rate and the SINR. In addition, each of the plurality of users 120, 130, and 140 may determine a preferred transmission rank. Here, the transmission rank denotes a number of data streams. Specifically, vectors corresponding to a number of data streams from among $2^B$ vectors may be selected as the preferred vectors.

Also, each of the users 120, 130, and 140 feeds back information associated with the selected preferred vector to the base station 110. Here, the information associated with the selected preferred vector may be referred to as a Channel Direction Information (CDI).

The base station 110 receives the information associated with the preferred vectors of each of the plurality of users 120, 130, and 140 to determine a pre-coding matrix. In addition, the base station 110 may select a part or all of the plurality of users 120, 130, and 140 using various user selection algorithms such as Semi-orthogonal User Selection (SUS), Greedy User Selection (GUS), and the like.

In this case, a codebook identical to the codebook stored in the plurality of users 120, 130, and 140 may be stored in the base station 110 in advance.

The base station 110 determines a pre-coding matrix from the previously stored codebook using information associated with the preferred vector received from the plurality of users 120, 130, and 140. The base station 110 may determine the pre-coding matrix such that a sum rate is maximized.

Also, the base station 110 performs pre-coding on data streams $S_1$ and $S_N$ using the determined pre-coding matrix to thereby generate the transmission signals. Here, a process for generating the transmission signals by the base station 110 may be referred to as 'beamforming'.

In 3GPP LTE ($3^{rd}$ Generation Partnership Project Long Term Evolution), a MU-MIMO codebook for the MU-MIMO system may be designed by redesign a codebook (hereinafter, referred to as RANK 1 SU-MIMO codebook) for the SU-MIMO system used where a rank is '1'.

The RANK 1 SU-MIMO codebook defined in 3GPP LTE includes 16 numbered vectors where a number of feedback bits is 4. Here, 16 numbered vectors may be grouped into four unitary matrixes $M_1$, $M_2$, $M_3$, and $M_4$, and the RANK 1 SU-MIMO codebook may be represented by $$M_1 = [u_1 \ u_2 \ u_3 \ u_4],$$
$$M_2 = [u_5 \ u_6 \ u_7 \ u_8],$$
$$M_3 = [u_9 \ u_{10} \ u_{11} \ u_{12}], \text{ and}$$
$$M_4 = [u_{13} \ u_{14} \ u_{15} \ u_{16}],$$

[Equation 1]

wherein, $$u_1 = \frac{1}{2}[1 \ 1 \ 1 \ 1]^T,$$
$$u_2 = \frac{1}{2}[1 \ j \ -1 \ -j]^T,$$
$$u_3 = \frac{1}{2}[1 \ -1 \ 1 \ -1]^T,$$
$$u_4 = \frac{1}{2}[1 \ -j \ -1 \ j]^T,$$
$$u_5 = \frac{1}{2}[1 \ e^{j\frac{\pi}{4}} \ j \ e^{j\frac{3\pi}{4}}]^T,$$
$$u_6 = \frac{1}{2}[1 \ e^{j\frac{3\pi}{4}} \ -j \ e^{j\frac{\pi}{4}}]^T,$$
$$u_7 = \frac{1}{2}[1 \ e^{j\frac{5\pi}{4}} \ j \ e^{-j\frac{\pi}{4}}]^T,$$
$$u_8 = \frac{1}{2}[1 \ e^{-j\frac{\pi}{4}} \ -j \ e^{j\frac{5\pi}{4}}]^T,$$
$$u_9 = \frac{1}{2}[1 \ 1 \ -1 \ -1]^T,$$
$$u_{10} = \frac{1}{2}[1 \ j \ 1 \ j]^T,$$
$$u_{11} = \frac{1}{2}[1 \ -1 \ -1 \ 1]^T,$$
$$u_{12} = \frac{1}{2}[1 \ -j \ 1 \ -j]^T,$$
$$u_{13} = \frac{1}{2}[1 \ 1 \ 1 \ -1]^T,$$
$$u_{14} = \frac{1}{2}[1 \ 1 \ -1 \ 1]^T,$$
$$u_{15} = \frac{1}{2}[1 \ -1 \ 1 \ 1]^T, \text{ and}$$
$$u_{16} = \frac{1}{2}[1 \ -1 \ -1 \ -1]^T.$$

Equation 1 denotes the RANK 1 SU-MIMO codebook defined in 3GPP LTE, and $M_1$ and $M_2$ are DRT matrixes. The DFT matrixes may be in a good match with a Line Of Site (LOS) channel.

However, $M_3$ and $M_4$ are matrixes that may be unsuitable for the MU-MIMO system. Also, $M_1$ and $M_2$ rather than $M_3$ and $M_4$ may be suitable for the MU-MIMO system, however, $M_1$ and $M_2$ may not be designed considering a case where the base station 110 has a plurality of sectors. Accordingly, where the base station 110 has the plurality of sectors, to apply $M_1$ and $M_2$ as they are to the MU-MIMO system may be unsuitable.

This may be because a coverage of each of the plurality of sectors may be reduced in a case where a cell of the base station 110 includes the plurality of sectors. For example, coverage of a single sector may be 120 degrees where the cell includes three sectors, and the coverage may be 60 degrees where the cell includes six sectors. Specifically, where the cell includes the plurality of sectors, to apply $M_1$ and $M_2$ as they are to the MU-MIMO system may unnecessarily increase a size of the codebook. Thus, the codebook may be comprised of only vectors required for covering the coverage of the single sector. In this case, by reducing the size of the codebook, a number of feedback bits may be reduced.

The codebook for the SU-MIMO system may include the DFT codebook. A 3-bit DFT codebook is comprised of $U_1 = [u_1 \ u_2 \ u_3 \ u_4]$ and $U_2 = [u_5 \ u_6 \ u_7 \ u_8]$, and a 4-bit DFT codebook is comprised of $U_1 = [u_1 \ u_2 \ u_3 \ u_4]$, $U_2 = [u_5 \ u_6 \ u_7 \ u_8]$, $U_3 = [u_9 \ u_{10} \ u_{11} \ u_{12}]$, and $U_4 = [u_{13} \ u_{14} \ u_{15} \ u_{16}]$.

Here, a b-th matrix $U^{(b)}$ of the DFT codebook and a (m+1)-th row vector $u_m^{(b)}$ of $U^{(b)}$ may be represented by $$U^{(b)} = [u_0^{(b)}, \ldots, u_{M-1}^{(b)}],$$

[Equation 2]

wherein, M denotes a number of transmission antennas.

Where the number of transmission antennas is 4, 16 numbered vectors included in the 4-bit DFT codebook may be represented by $$u_1 = [0.5 \ 0.5 \ 0.5 \ 0.5]^T,$$
$$u_2 = [0.5 \ 0.5j \ -0.5 \ -0.5j]^T,$$
$$u_3 = [0.5 \ -0.5 \ 0.5 \ -0.5]^T,$$
$$u_4 = [0.5 \ -0.5j \ -0.5 \ 0.5j]^T,$$
$$u_5 = [0.5 \ 0.4619+0.1913j \ 0.3536+0.536j \ 0.1913+0.4619j]^T,$$
$$u_6 = [0.5 \ -0.1913+0.4619j \ -0.3536-0.3536j \ 0.419-0.1913j]^T,$$
$$u_7 = [0.5 \ -0.4619-0.1913j \ 0.3536+0.3536j \ -0.1913-0.4619j]^T,$$
$$u_8 = [0.5 \ 0.1913-0.4619j \ -0.3536-0.3536j \ -0.4619+0.1913j]^T,$$
$$u_9 = [0.5 \ 0.3536+0.3536j \ 0.5j \ -0.3536+0.3536j]^T,$$
$$u_{10} = [0.5 \ -0.3536+0.3536j \ -0.5j \ 0.3536+0.3536j]^T,$$
$$u_{11} = [0.5 \ -0.3536-0.3536j \ 0.5j \ 0.3536-0.3536j]^T,$$
$$u_{12} = [0.5 \ 0.3536-0.3536j \ -0.5j \ -0.3536-0.3536j]^T,$$
$$u_{13} = [0.5 \ 0.1913+0.4619j \ -0.3536+0.3536j \ -0.4619-0.1913j]^T,$$
$$u_{14} = [0.5 \ -0.4619+0.1913j \ 0.3536-0.3536j \ -0.1913+0.4619j]^T,$$
$$u_{15} = [0.5 \ -0.1913-0.4619j \ -0.3536+0.3536j \ 0.4619+0.1913j]^T,$$

and $$u_{16} = [0.5 \ 0.4619-0.1913j \ 0.3536-0.3536j \ 0.1913-0.4619j]^T.$$

[Equation 3]

The DFT codebook as described above is designed without considering a case where the base station 110 includes the plurality of sectors, like the RANK 1 SU-MIMO codebook defined in 3GPP LTE.

Like the RANK 1 SU-MIMO codebook, to use the DFT codebook, as is, may unnecessarily increase the size of the codebook where the cell includes the plurality of sectors, which may result in being unsuitable.

In this case, whether an appropriate codebook is newly designed by selecting vectors from among vectors included in the original DFT codebook or the RANK 1 SU-MIMO codebook where the cell includes the plurality of sectors will be herein described.

Figure 2:
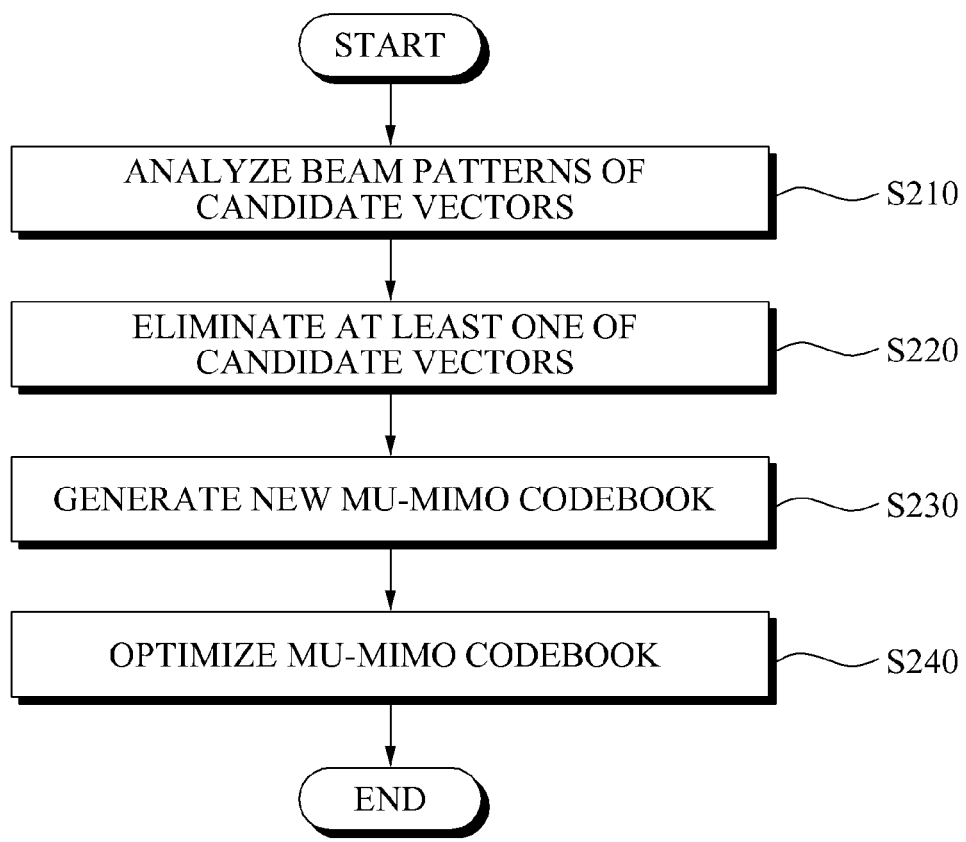
FIG. 2 is an operation flowchart illustrating a MU-MIMO codebook design method according to an exemplary embodiment.

FIG. 2 illustrates a MU-MIMO codebook design method according to an exemplary embodiment.

Figure 3:
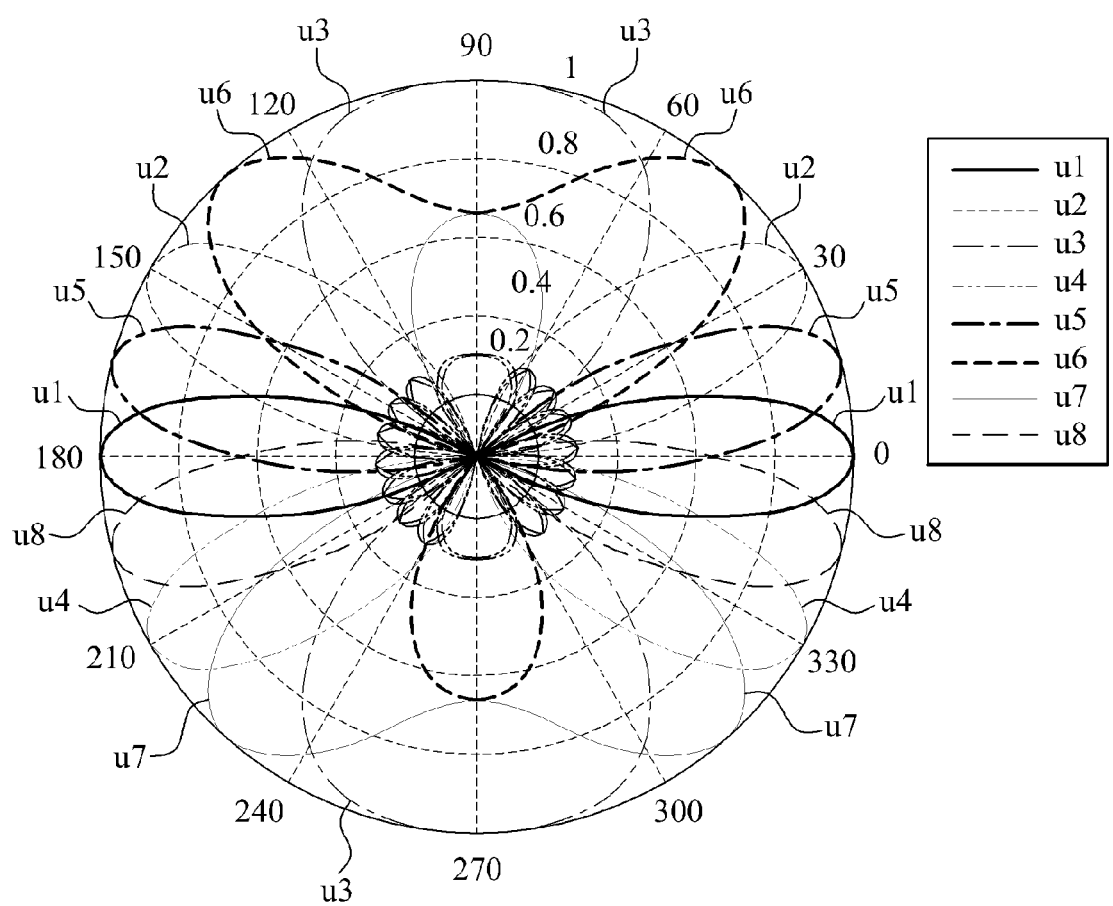
FIG. 3 is a diagram illustrating beam patterns of $u_1, u_2, u_3, u_4, u_5, u_6, u_7, u_8$ included in a codebook defined in $3^{rd}$ Generation Partnership Project Long Term Evolution (3GPP LTE).
Figure 4:
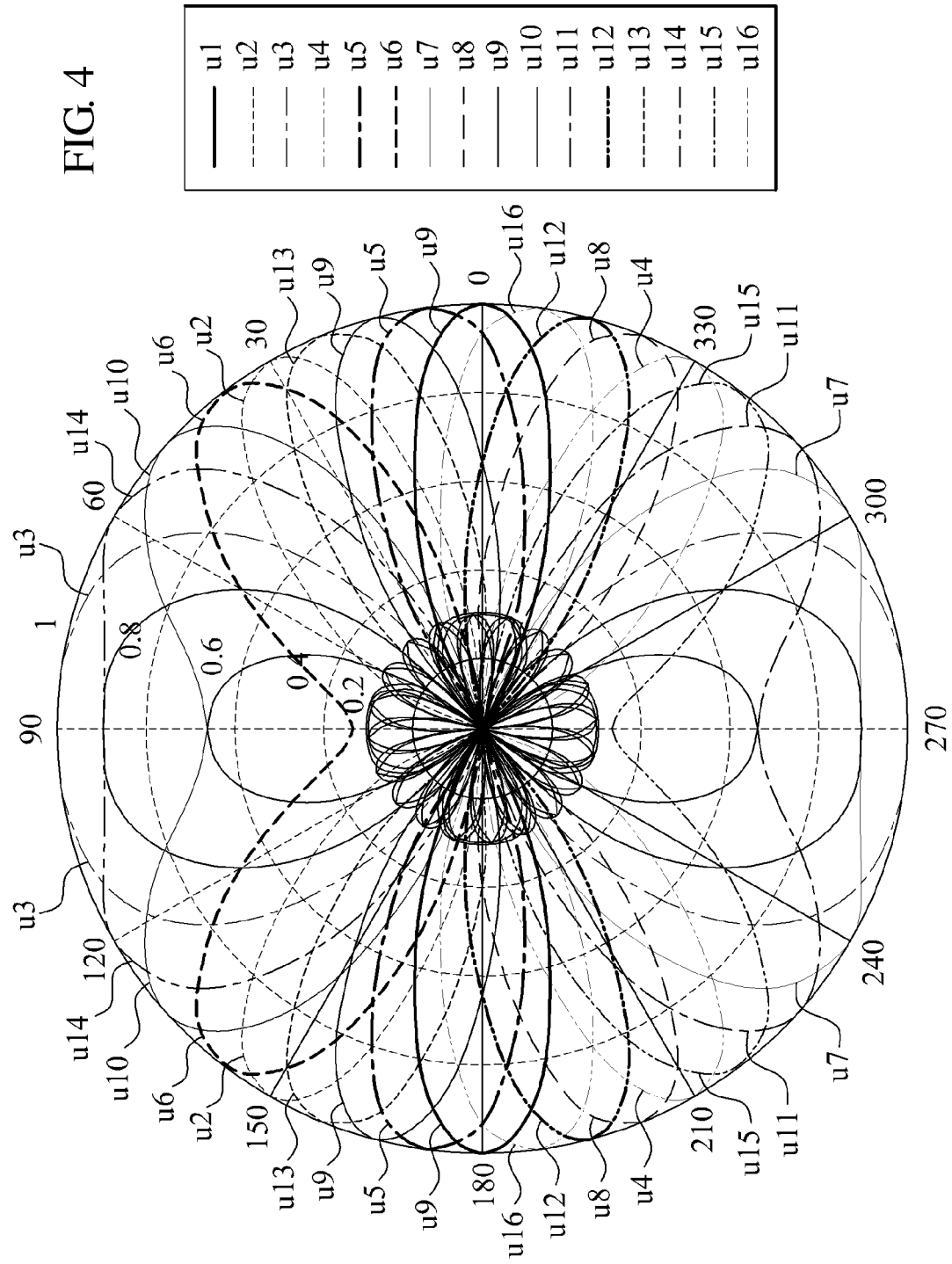
FIG. 4 is a diagram illustrating beam patterns of $u_1, u_2, u_3, u_4, u_5, u_6, u_7, u_8, u_9, u_{10}, u_{11}, u_{12}, u_{13}, u_{14}, u_{15}, u_{16}$ included in 4-bit Discrete Fourier Transformation (DFT) codebook.

FIG. 3 illustrates beam patterns of $u_1$, $u_2$, $u_3$, $u_4$, $u_5$, $u_6$, $u_7$, $u_8$ included in a codebook defined in 3GPP LTE, and FIG. 4 illustrates beam patterns of $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, $u_{16}$ included in 4-bit DFT codebook.

Referring to FIG. 2, the MU-MIMO codebook design method comprises analyzing beam patterns of candidate vectors included in a candidate codebook previously prepared in operation S210.

In this embodiment, the candidate codebook is a codebook for a SU-MIMO system, and the codebook for the SU-MIMO system may include the DFT codebook or a codebook defined in 3GPP LTE.

Referring to FIG. 3, each of eight vectors included in the codebook defined in 3GPP LTE has unique beam patterns. In particular, $u_3$ from among eight vectors has the widest lobe.

In a case where a cell of the base station is comprised of three sectors, a coverage of a single cell is 120 degrees. In this case, a coverage of 120 degrees ranging from 60 to −60 degrees may be seen to be well-covered using the remaining seven vectors obtained by eliminating $u_3$ from among eight vectors. Also, a coverage of each of three sectors may be seen to be well-covered using the remaining seven vectors in an identical manner.

Also, in a case where the cell of the base station is comprised of six sectors, a coverage of a single cell is 60 degrees. In this case, a coverage of 60 degrees ranging from 30 to −30 degrees may be seen to be well-covered using $u_2$, $u_5$, $u_1$, $u_8$ or $u_5$, $u_1$, $u_8$, $u_4$.

Referring to FIG. 4, the 4-bit DFT codebook is comprised of sixteen vectors. In a case where the cell of the base station is comprised of three sectors, a coverage of a single cell is 120 degrees, and a coverage of 120 degrees ranging from 60 to −60 degrees may be seen to be well-covered using [$u_{14}$ $u_{10}$ $u_6$ $u_2$ $u_{13}$ $u_9$ $u_5$ $u_1$ $u_{16}$ $u_{12}$ $u_8$ $u_4$ $u_{15}$ $u_{11}$] or [$u_{10}$ $u_6$ $u_2$ $u_{13}$ $u_9$ $u_5$ $u_1$ $u_{16}$ $u_{12}$ $u_8$ $u_4$ $u_{15}$ $u_{11}$ $u_7$].

Consequently, where the cell of the base station includes the plurality of sectors, the coverage of the single sector may be well-covered even without using eight vectors included in the codebook defined in 3GPP LTE or sixteen vectors included in the 4-bit DFT codebook. As a result, a size of the codebook may be reduced, and the number of feedback bits may be reduced along with a reduction in the size of the codebook.

Referring back to FIG. 2, the MU-MIMO codebook design method further comprises eliminating at least one vector of the candidate vectors based on the beam patterns of the candidate vectors in operation S220. Here, the operation S220 for eliminating at least one vector may be an operation for eliminating at least one vector of the candidate vectors based on a coverage of each of the plurality of sectors.

The MU-MIMO codebook design method further comprises eliminating at least one vector of the candidate vectors according to the beam patterns of the candidate vectors, and generating a MU-MIMO codebook for the MU-MIMO system being comprised of the remaining vectors obtained by eliminating the at least one vector, in operation S230.

In a case of the cell comprised of the plurality of sectors, the operation S230 for generating the MU-MIMO codebook may be an operation for eliminating at least one vector of the candidate vectors according to a coverage corresponding to each of the plurality of sectors to thereby generate the MU-MIMO codebook being comprised of the remaining vectors. Here, a coverage of each of the plurality of sectors may be well-covered using the MU-MIMO codebook being identical for each of the plurality of sectors.

In the case of the cell comprised of the plurality of sectors, the operation S230 for generating the MU-MIMO codebook may be an operation for generating the MU-MIMO codebook in order to well-cover a single sector by the remaining vectors.

Also, the operation S230 for generating the MU-MIMO codebook may be an operation for eliminating at least one vector of the candidate vectors in the order from a largest beam width of the candidate vectors to thereby generate the MU-MIMO codebook being comprised of the remaining vectors.

As an example, the operation S230 may generate the MU-MIMO codebook as [$u_2$ $u_5$ $u_1$ $u_8$] or [$u_5$ $u_1$ $u_8$ $u_4$] where the cell is comprised of three sectors and the previously prepared candidate codebook is the codebook for SU-MIMO system defined in 3GPP LTE.

Here, $$u_1 = \frac{1}{2}[1 \quad 1 \quad 1 \quad 1]^T,$$

$$u_2 = \frac{1}{2}[1 \quad j \quad -1 \quad -j]^T,$$

$$u_4 = \frac{1}{2}[1 \quad -j \quad -1 \quad j]^T,$$

$$u_5 = \frac{1}{2}\left[1 \quad e^{j\frac{\pi}{4}} \quad j \quad e^{j\frac{3\pi}{4}}\right]^T \text{ and}$$

$$u_8 = \frac{1}{2}\left[1 \quad e^{-j\frac{\pi}{4}} \quad -j \quad e^{j\frac{5\pi}{4}}\right]^T.$$

As another example, the operation S230 for generating the MU-MIMO codebook may generate the MU-MIMO codebook as [$u_2$ $u_5$ $u_1$ $u_8$] or [$u_5$ $u_1$ $u_8$ $u_4$] where the cell is comprised of six sectors and the previously prepared candidate codebook is the codebook for MU-MIMO system defined in 3GPP LTE.

Here, $$u_1 = \frac{1}{2}[1 \quad 1 \quad 1 \quad 1]^T,$$

$$u_2 = \frac{1}{2}[1 \quad j \quad -1 \quad -j]^T,$$

$$u_4 = \frac{1}{2}[1 \quad -j \quad -1 \quad j]^T,$$

$$u_5 = \frac{1}{2}\left[1 \quad e^{j\frac{\pi}{4}} \quad j \quad e^{j\frac{3\pi}{4}}\right]^T \text{ and}$$

$$u_8 = \frac{1}{2}\left[1 \quad e^{-j\frac{\pi}{4}} \quad -j \quad e^{j\frac{5\pi}{4}}\right]^T.$$

As another example, the operation S230 for generating the MU-MIMO codebook may generate the MU-MIMO codebook as [$u_{14}$ $u_{10}$ $u_6$ $u_2$ $u_{13}$ $u_9$ $u_5$ $u_1$ $u_{16}$ $u_{12}$ $u_8$ $u_4$ $u_{15}$ $u_{11}$] or [$u_{10}$ $u_6$ $u_2$ $u_{13}$ $u_9$ $u_5$ $u_1$ $u_{16}$ $u_{12}$ $u_8$ $u_4$ $u_{15}$ $u_{11}$ $u_7$] where the cell is comprised of three sectors and the previously prepared candidate codebook is the 4-bit DFT codebook. Here, $u_1$=[0.5 0.5 0.5 0.5]$^T$, $u_2$=[0.5 0.5$j$ −0.5 −0.5$j$]$^T$, $u_4$=[0.5 −0.5$j$ −0.5 0.5$j$]$^T$, $u_5$=[0.5 0.4619+0.1913$j$ 0.3536+0.536$j$ 0.1913+ 0.4619$jj$]$^T$, $u_6$=[0.5 −0.1913+0.4619$j$ −0.3536−0.3536$j$ 0.419− 0.1913$jj$]$^T$, $u_7=[0.5-0.4619-0.1913j 0.3536+0.3536j-0.1913-0.4619j j]^T$, $u_8=[0.50.1913-0.4619j-0.3536-0.3536j-0.4619+0.1913j j]^T$, $u_9=[0.50.3536+0.3536j 0.5j-0.3536+0.3536j j]^T$, $u_{10}=[0.5-0.3536+0.3536j-0.5j 0.3536+0.3536j j]^T$, $u_{11}=[0.5-0.3536-0.3536j 0.5j 0.3536-0.3536j j]^T$, $u_{12}=[0.50.3536-0.3536j-0.5j-0.3536-0.3536j j]^T$, $u_{13}=[0.50.1913+0.4619j-0.3536+0.3536j-0.4619-0.1913j j]^T$, $u_{14}=[0.5-0.4619+0.1913j 0.3536-0.3536j-0.1913+0.4619j j]^T$, $u_{15}=[0.5-0.1913-0.4619j-0.3536+0.3536j 0.4619+0.1913j j]^T$, and $u_{16}=[0.50.4619-0.1913j 0.3536-0.3536j 0.1913-0.4619j j]^T$.

As another example, the operation S230 for generating the MU-MIMO codebook may generate the MU-MIMO codebook as [u₂ u₁₃ u₉ u₅ u₁ u₁₆ u₁₂ u₈] or [u₁₃ u₉ u₅ u₁ u₁₆ u₁₂ u₈ u₄] where the cell is comprised of six sectors and the previously prepared candidate codebook is the 4-bit DFT codebook.
Here, $u_1=[0.50.50.50.5]^T$, $u_2=[0.50.5j-0.5-0.5jj]^T$, $u_4=[0.5-0.5j-0.50.5jj]^T$, $u_5=[0.50.4619+0.1913j 0.3536+0.536j 0.1913+0.4619j j]^T$, $u_8=[0.50.1913-0.4619j-0.3536-0.3536j-0.4619+0.1913j j]^T$, $u_9=[0.50.3536+0.3536j 0.5j-0.3536+0.3536j j]^T$, $u_{12}=[0.50.3536-0.3536j-0.5j-0.3536-0.3536j j]^T$, $u_{13}=[0.50.1913+0.4619j-0.3536+0.3536j-0.4619-0.1913j j]^T$, and $u_{16}=[0.50.4619-0.1913j 0.3536-0.3536j 0.1913-0.4619j j]^T$.

Accordingly, the MU-MIMO codebook design method according to an exemplary embodiment may appropriately select vectors based on a number of sectors included in the cell and a coverage of each of the sectors, thereby minimizing a size of the codebook while well-covering the coverage of each of the sectors.

Referring back to FIG. 2, the MU-MIMO codebook design method further comprises optimizing the MU-MIMO codebook based on interferences generated between the remaining vectors in operation S240.

The operation S240 for optimizing the MU-MIMO codebook may be an operation for selecting a part or all of the remaining vectors depending on a predetermined number of feedback bits based on the interference generated between the remaining vectors. In addition, the operation S240 for optimizing the MU-MIMO codebook may be an operation for calculating SINR of the remaining vectors based on the interferences generated between the remaining vectors, and selecting a part or all of the remaining vectors based on the SINR of the remaining vectors.

A size of the MU-MIMO codebook, that is, a number of vectors included in the MU-MIMO codebook may be determined depending on a number of feedback bits. For example, where the number of feedback bits is 3, the number of vectors included in the MU-MIMO codebook may be limited to 8 or less, and where the number of feedback bits is 4, the number of vectors included in the MU-MIMO codebook may be limited to 16 or less.

Accordingly, the MU-MIMO codebook generated through the operation S230 for generating the MU-MIMO codebook may be adjusted or optimized in size depending on the number of feedback bits. In this case, the MU-MIMO codebook is comprised of the remaining vectors obtained by eliminating at least one vector of the candidate vectors.

A metric used for optimizing the MU-MIMO codebook may be determined based on a Signal to Interference Ratio (SIR). In particular, $SIR_{i,j}$, that is, an SIR of an i-th beam with respect to a j-th beam may be represented by

[Equation 4]

$$SIR_{i,j} = \min_{\theta \in \alpha_i} \left|\frac{A_i(\theta)}{A_j(\theta)}\right|^2,$$

$A_i(\theta) = |\text{space}(\theta) u_i^H|$, and $$\text{space}(\theta) = \left[1, e^{-j\frac{2\pi}{\lambda}d\sin\theta}, \ldots, e^{-j\frac{2\pi}{\lambda}(n-1)d\sin\theta} \ldots e^{-j\frac{2\pi}{\lambda}(N-1)d\sin\theta}\right],$$

wherein $\alpha_i$ denotes a space angle interval in which a beamforming gain of an i-th beam is maximized, θ denotes an element included in $\alpha_i$, $A_i(\theta)$ denotes the beamforming gain of the i-th beam, λ denotes a wavelength, d denotes an interval between transmission antennas, n denotes an index of the transmission antennas, and N denotes a number of transmission antennas.

Since physically adjacent beams are not simultaneously used in a Space Division Multiple Access (SDMA) system or the MU-MIMO system, a SIR between the adjacent beams may be regarded as '1'.

$SIR_{i,j}$ may be calculated with respect to each of the vectors included in the MU-MIMO codebook generated through the operation S230 for generating the MU-MIMO codebook. Also, $SIR_{min}$ of a minimum value from among $SIR_{i,j}$ calculated with respect to each of sub-sets of the MU-MIMO codebook may be ascertained.

A sub-set corresponding to a maximum value of $SIR_{min}$ calculated with respect to each of the sub-sets of the MU-MIMO codebook and having a size corresponding to the number of feedback bits may be selected as an optimized MU-MIMO codebook.

For example, in a case of the 4-bit DFT codebook, it is assumed that [u₁₄ u₁₀ u₆ u₂ u₁₃ u₉ u₅ u₁ u₁₆ u₁₂ u₈ u₄ u₁₅ u₁₁] or [u₁₀ u₆ u₂ u₁₃ u₉ u₅ u₁ u₁₆ u₁₂ u₈ u₄ u₁₅ u₁₁ u₇] may be generated as the MU-MIMO codebook through the operation S230 for generating the MU-MIMO codebook. Where the number of feedback bits is limited to 3, the number of vectors included in the MU-MIMO codebook may be limited to 8 or less. Where the number of vectors included in the MU-MIMO codebook is 8, $C^8_{14}$ numbered sub-sets may exist. In this case, $SIR_{i,j}$ with respect to vectors included in each of the sub-sets may be calculated, and $SIR_{min}$ with respect to each of the sub-sets may be ascertained. Also, a sub-set corresponding to a maximum value of $SIR_{min}$ with respect to each of the subsets may be an optimized MU-MIMO codebook.

Figure 5:
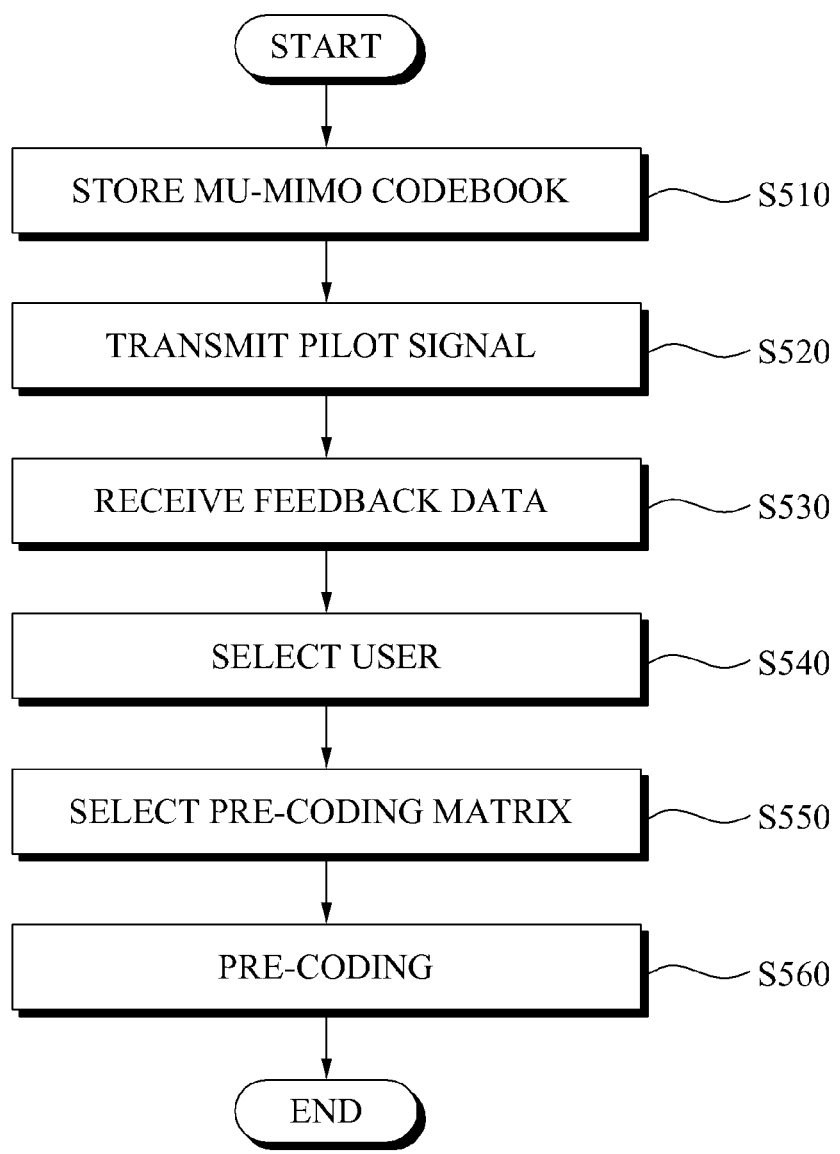
FIG. 5 is an operation flowchart illustrating a method for operating a base station according to an exemplary embodiment.
Figure 6:
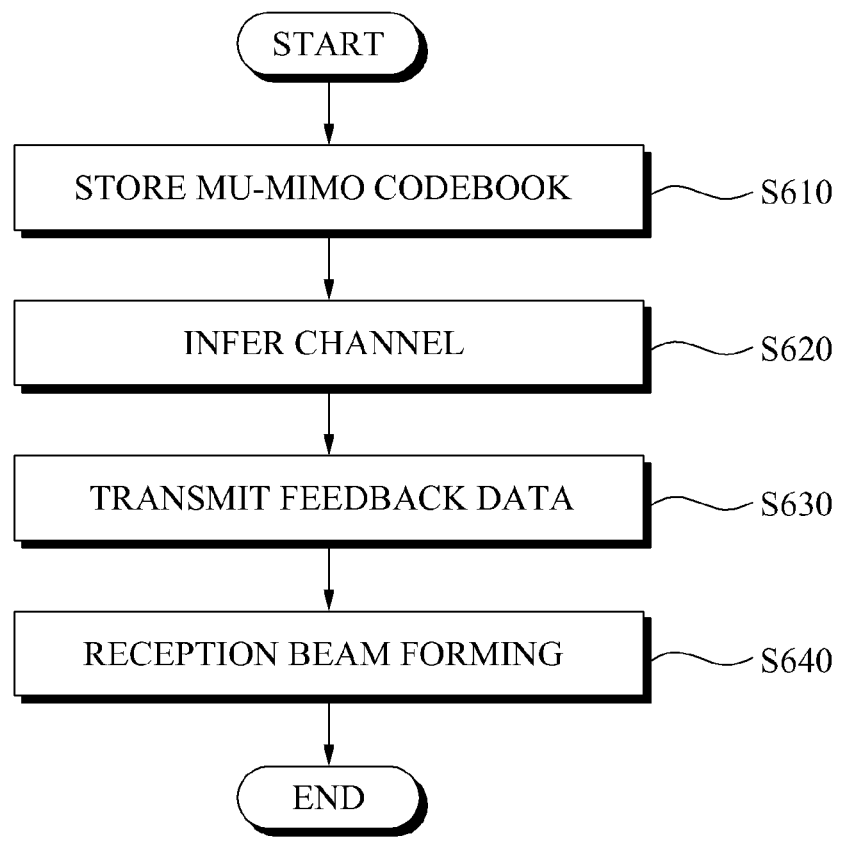
FIG. 6 is an operation flowchart illustrating a method for operating a terminal according to an exemplary embodiment.

FIG. 5 illustrates a method for operating a base station according to an exemplary embodiment, and FIG. 6 illustrates a method for operating a terminal according to an exemplary embodiment.

Referring to FIG. 5, in operation S510, the base station stores a MU-MIMO codebook designed according to an exemplary embodiment described above.

Referring to FIG. 6, in operation S610, the terminal stores the MU-MIMO codebook like the base station.

In operation S520, the base station transmits, to a plurality of terminals, pilot signals having been well-known to the plurality of terminals.

In operation S620, the terminal estimates a channel formed between the base station and the terminal using the pilot signals. In this case, the terminal may ascertain quality and direction of the channel.

In operation S630, the terminal transmits feedback data, that is, information associated with the estimated channel to the base station. A number of bits of the feedback data may be determined in advance, and the number of feedback bits may be associated with a size of the codebook. In particular, the feedback data may include index information of a preferred vector from among a plurality of vectors included in the codebook.

In operation S530, the base station receives the feedback data from the terminal.

In operation S540, the base station receives the feedback data of each of the plurality of terminals, and selects a part or all of the plurality of terminals (users).

In operation S550, the base station selects a pre-coding matrix from among sub-sets of the codebook based on the feedback data of each of the plurality of terminals.

In operation S560, the base station performs pre-coding on at least one data stream for selected users using the selected pre-coding matrix.

In operation S640, the terminal performs reception beamforming based on a preferred vector in a case where the terminal has a plurality of reception antennas.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station comprising:
a memory configured to store vectors as a Multiple User Multiple Input Multiple Output (MU-MIMO) codebook;
a receiving unit configured to receive feedback information transmitted in response to a pilot signal; and
a precoder configured to precode at least one data stream using the stored MU-MIMO codebook,
wherein the MU-MIMO codebook is generated based on beam patterns of candidate vectors included in a predetermined candidate codebook.

2. The base station of claim 1, wherein the precoder is configured to precode the at least one data stream using the stored MU-MIMO codebook and the feedback information.

3. The base station of claim 1, the MU-MIMO codebook is generated by eliminating at least one of the candidate vectors.

4. The base station of claim 1, wherein the predetermined candidate codebook is a codebook for a Single User Multiple Input Multiple Output (SU-MIMO) system, and the codebook for the SU-MIMO system includes Discrete Fourier Transformation (DFT) codebook or a codebook defined in 3rd Generation Partnership Project Long Term Evolution (3GPP LTE).

5. A terminal comprising:
a memory configured to store vectors as a Multiple User Multiple Input Multiple Output (MU-MIMO) codebook;
a generating unit configured to generate feedback information transmitted in response to a pilot signal; and
a feeding-back unit configured to feedback, to a base station, information related with at least one vector from among vectors included in the stored MU-MIMO codebook,
wherein the MU-MIMO codebook is generated based on beam patterns of candidate vectors included in a predetermined candidate codebook.

6. The terminal of claim 5, wherein at least one data stream is precoded using the stored MU-MIMO codebook and the feedback information.

7. The terminal of claim 5, the MU-MIMO codebook is generated by eliminating at least one of the candidate vectors.

8. The terminal of claim 5, wherein the predetermined candidate codebook is a codebook for a Single User Multiple Input Multiple Output (SU-MIMO) system, and the codebook for the SU-MIMO system includes Discrete Fourier Transformation (DFT) codebook or a codebook defined in 3rd Generation Partnership Project Long Term Evolution (3GPP LTE).

* * * * *